US012621711B2

(12) United States Patent
Kanamarlapudi et al.

(10) Patent No.: US 12,621,711 B2
(45) Date of Patent: May 5, 2026

(54) DISCARD TIMER FOR PROTOCOL DATA UNIT COMMUNICATIONS

(71) Applicant: QUALCOMM Incorporated, San Diego, CA (US)

(72) Inventors: Sitaramanjaneyulu Kanamarlapudi, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 18/593,382

(22) Filed: Mar. 1, 2024

(65) Prior Publication Data

US 2024/0314633 A1     Sep. 19, 2024

Related U.S. Application Data

(60) Provisional application No. 63/490,732, filed on Mar. 16, 2023.

(51) Int. Cl.
| | |
|---|---|
| *G06F 13/00* | (2006.01) |
| *H04W 28/02* | (2009.01) |
| *H04W 28/06* | (2009.01) |

(52) U.S. Cl.
CPC ....... *H04W 28/06* (2013.01); *H04W 28/0268* (2013.01)

(58) Field of Classification Search
CPC .. H04W 28/06; H04W 28/0268; H04L 47/28; H04L 47/32

USPC .......... 709/238, 230, 234; 713/500–503, 600
See application file for complete search history.

(56) References Cited

U.S. PATENT DOCUMENTS

| | | | | |
|---|---|---|---|---|
| 10,917,817 | B2 | 2/2021 | Eriksson et al. | |
| 11,539,477 | B2 * | 12/2022 | Ohta | H04W 80/02 |
| 11,838,134 | B2 * | 12/2023 | Ohta | H04L 1/1874 |
| 2020/0084668 | A1 * | 3/2020 | Eriksson | H04W 28/14 |
| 2021/0111841 | A1 | 4/2021 | Ohta et al. | |
| 2023/0115181 | A1 | 4/2023 | Huang et al. | |
| 2023/0224383 | A1 | 7/2023 | Wang et al. | |
| 2023/0328000 | A1 * | 10/2023 | Wang | H04W 28/0268 |
| | | | | 370/235 |
| 2025/0063000 | A1 * | 2/2025 | He | H04W 28/06 |
| 2025/0168699 | A1 * | 5/2025 | Teyeb | H04L 1/1883 |

OTHER PUBLICATIONS

International Search Report and Written Opinion—PCT/US2024/018359—ISA/EPO—Jun. 7, 2024.

(Continued)

*Primary Examiner* — Kenneth R Coulter
(74) *Attorney, Agent, or Firm* — Harrity & Harrity, LLP

(57) ABSTRACT

Various aspects of the present disclosure generally relate to wireless communication. In some aspects, a user equipment (UE) may receive a first discard timer value associated with a radio bearer. The UE may receive a multiplier value that is associated with a characteristic of a protocol data unit or a protocol data unit set to be transmitted via the radio bearer. The UE may initiate a discard timer for the protocol data unit or the protocol data unit set, the discard timer having a second discard timer value that corresponds to the first discard timer value multiplied by the multiplier value. Numerous other aspects are described.

30 Claims, 12 Drawing Sheets

600 →

UE
120

Network
Node
110

First discard timer value associated with a radio bearer
605

Multiplier value that is associated with a characteristic of a PDU or a PDU set to be transmitted via the radio bearer
610

Initiate a discard timer for the PDU or the PDU set, the discard timer having a second discard timer value that corresponds to the first discard timer value multiplied by the multiplier value
615

(56)     References Cited

OTHER PUBLICATIONS

Lenovo: "Discussion on PDU discarding", 3GPP TSG-RAN WG2 Meeting #121 meeting, R2-2300908, 3rd Generation Partnership Project, Mobile Competence Centre, 650, Route Des Lucioles, F-06921, Sophia-Antipolis Cedex, France, vol. 3GPP RAN 2, No. Athens, GR, Feb. 27, 2023-Mar. 3, 2023, Feb. 16, 2023, XP052245551, 4 Pages, p. 1-p. 3.

Mediatek: [POST111e][909]NTN] RLC and PDCP aspects (MediaTek)H, 3GPP RAN WG2 112e, R2-2008896, 3rd Generation Partnership Project, Mobile Competence Centre, 650, Route Des Lucioles, F-06921, Sophia-Antipolis Cedex, France, vol. RAN WG2, No. Online, Nov. 2, 2020-Nov. 13, 2020, Oct. 23, 2020, XP051941974, 23 Pages, p. 12-p. 16.

3GPP TR 23.700-60: "3rd Generation Partnership Project: Technical Specification Group Services and System Aspects: Study on XR (Extended Reality) and Media Services (Release 18)", 3GPP TR 23.700-60, V18.0.0, Dec. 2022, pp. 1-266.

CMCC: "Further Considerations on PDU Discard", 3GPP TSG RAN WG2#121, R2-2301266, Athens, Feb. 27-Mar. 3, 2023, 4 Pages.

* cited by examiner

400

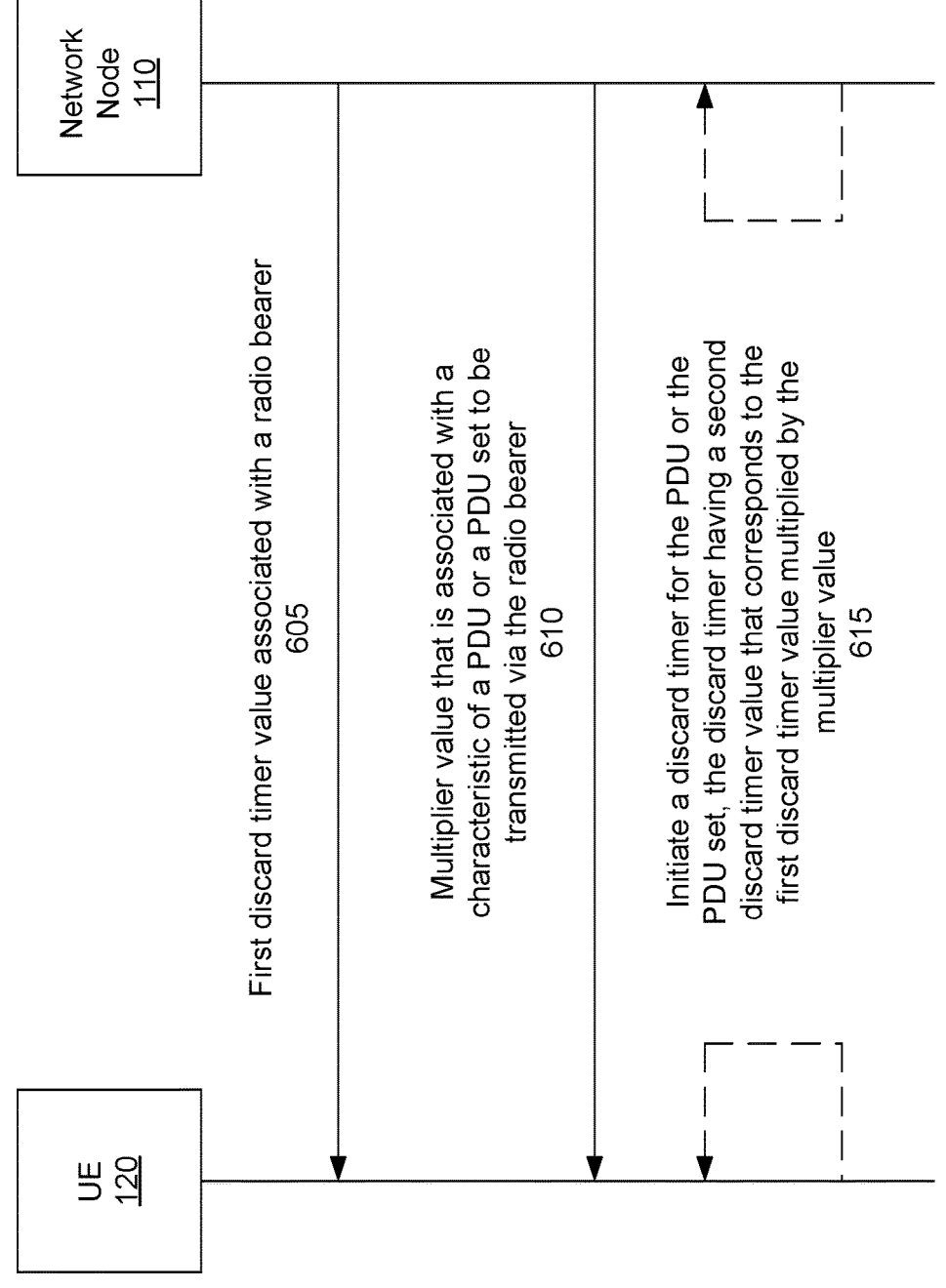

Network
Node
110

UE
120

First discard timer value associated with a radio bearer
605

Multiplier value that is associated with a characteristic of a PDU or a PDU set to be transmitted via the radio bearer
610

Initiate a discard timer for the PDU or the PDU set, the discard timer having a second discard timer value that corresponds to the first discard timer value multiplied by the multiplier value
615

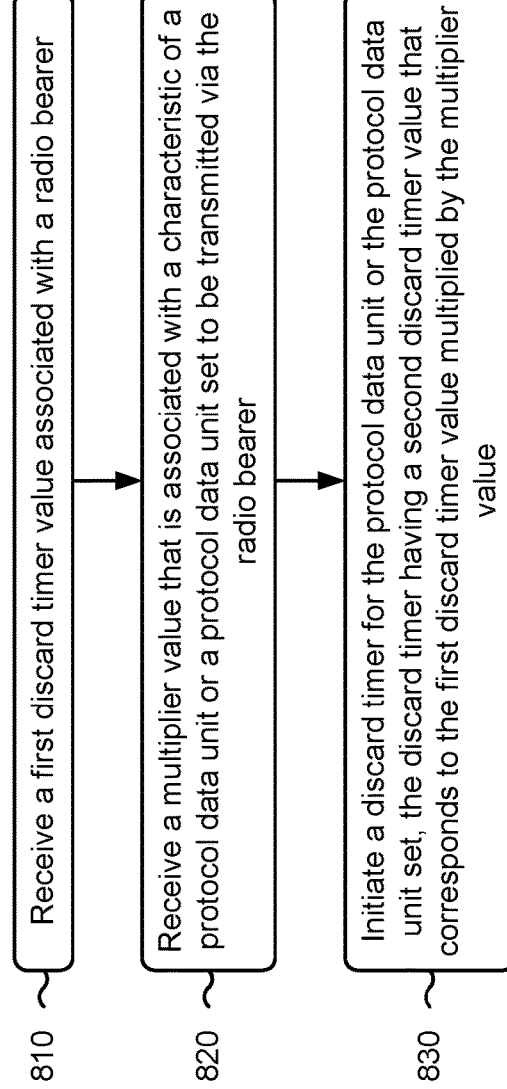

810　Receive a first discard timer value associated with a radio bearer

820　Receive a multiplier value that is associated with a characteristic of a protocol data unit or a protocol data unit set to be transmitted via the radio bearer 830　Initiate a discard timer for the protocol data unit or the protocol data unit set, the discard timer having a second discard timer value that corresponds to the first discard timer value multiplied by the multiplier value

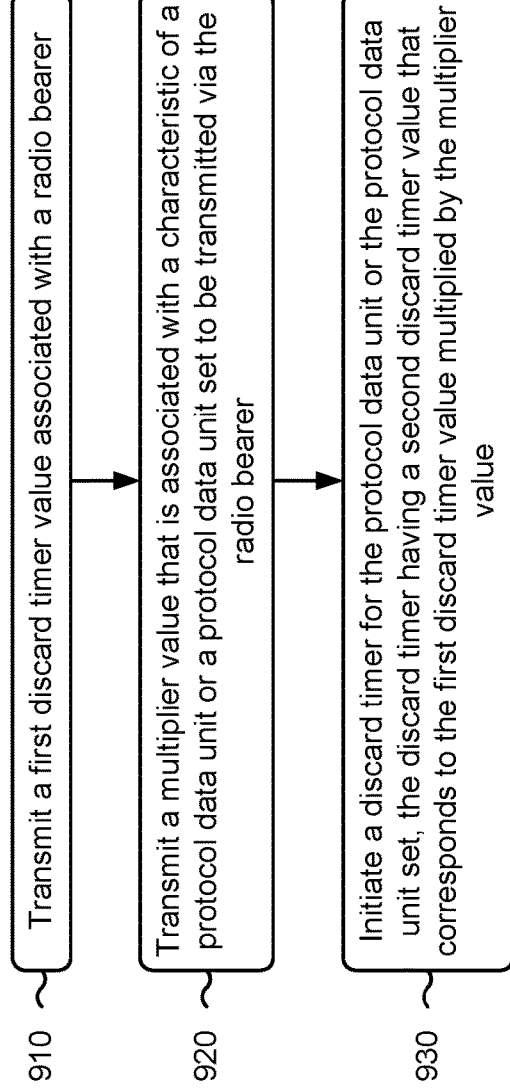

910 — Transmit a first discard timer value associated with a radio bearer

920 — Transmit a multiplier value that is associated with a characteristic of a protocol data unit or a protocol data unit set to be transmitted via the radio bearer 930 — Initiate a discard timer for the protocol data unit or the protocol data unit set, the discard timer having a second discard timer value that corresponds to the first discard timer value multiplied by the multiplier value

DISCARD TIMER FOR PROTOCOL DATA UNIT COMMUNICATIONS

CROSS-REFERENCE TO RELATED APPLICATION

This patent application claims priority to U.S. Provisional Patent Application No. 63/490,732, filed on Mar. 16, 2023, entitled "DISCARD TIMER FOR PROTOCOL DATA UNIT COMMUNICATIONS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for a discard timer for protocol data unit communications.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a method of wireless communication performed by a user equipment (UE). The method may include receiving a first discard timer value associated with a radio bearer. The method may include receiving a multiplier value that is associated with a characteristic of a protocol data unit or a protocol data unit set to be transmitted via the radio bearer. The method may include initiating a discard timer for the protocol data unit or the protocol data unit set, the discard timer having a second discard timer value that corresponds to the first discard timer value multiplied by the multiplier value.

Some aspects described herein relate to a method of wireless communication performed by a network node. The method may include transmitting a first discard timer value associated with a radio bearer. The method may include transmitting a multiplier value that is associated with a characteristic of a protocol data unit or a protocol data unit set to be transmitted via the radio bearer. The method may include initiating a discard timer for the protocol data unit or the protocol data unit set, the discard timer having a second discard timer value that corresponds to the first discard timer value multiplied by the multiplier value.

Some aspects described herein relate to an apparatus for wireless communication at a UE. The apparatus may include a memory and one or more processors coupled to the memory. The one or more processors may be configured to receive a first discard timer value associated with a radio bearer. The one or more processors may be configured to receive a multiplier value that is associated with a characteristic of a protocol data unit or a protocol data unit set to be transmitted via the radio bearer. The one or more processors may be configured to initiate a discard timer for the protocol data unit or the protocol data unit set, the discard timer having a second discard timer value that corresponds to the first discard timer value multiplied by the multiplier value.

Some aspects described herein relate to an apparatus for wireless communication at a network node. The apparatus may include a memory and one or more processors coupled to the memory. The one or more processors may be configured to transmit a first discard timer value associated with a radio bearer. The one or more processors may be configured to transmit a multiplier value that is associated with a characteristic of a protocol data unit or a protocol data unit set to be transmitted via the radio bearer. The one or more processors may be configured to initiate a discard timer for the protocol data unit or the protocol data unit set, the discard timer having a second discard timer value that corresponds to the first discard timer value multiplied by the multiplier value.

Some aspects described herein relate to a non-transitory computer-readable medium that stores a set of instructions for wireless communication by a UE. The set of instructions, when executed by one or more processors of the UE, may cause the UE to receive a first discard timer value associated with a radio bearer. The set of instructions, when executed by one or more processors of the UE, may cause the UE to receive a multiplier value that is associated with a characteristic of a protocol data unit or a protocol data unit set to be transmitted via the radio bearer. The set of instructions, when executed by one or more processors of the UE, may cause the UE to initiate a discard timer for the protocol data unit or the protocol data unit set, the discard timer having a second discard timer value that corresponds to the first discard timer value multiplied by the multiplier value.

Some aspects described herein relate to a non-transitory computer-readable medium that stores a set of instructions for wireless communication by a network node. The set of instructions, when executed by one or more processors of the network node, may cause the network node to transmit a first discard timer value associated with a radio bearer. The set of instructions, when executed by one or more processors of the network node, may cause the network node to transmit a multiplier value that is associated with a characteristic of a protocol data unit or a protocol data unit set to be transmitted via the radio bearer. The set of instructions, when executed by one or more processors of the network node, may cause the network node to initiate a discard timer for the protocol data unit or the protocol data unit set, the discard timer having a second discard timer value that corresponds to the first discard timer value multiplied by the multiplier value.

Some aspects described herein relate to an apparatus for wireless communication. The apparatus may include means for receiving a first discard timer value associated with a radio bearer. The apparatus may include means for receiving a multiplier value that is associated with a characteristic of a protocol data unit or a protocol data unit set to be transmitted via the radio bearer. The apparatus may include means for initiating a discard timer for the protocol data unit or the protocol data unit set, the discard timer having a second discard timer value that corresponds to the first discard timer value multiplied by the multiplier value.

Some aspects described herein relate to an apparatus for wireless communication. The apparatus may include means for transmitting a first discard timer value associated with a radio bearer. The apparatus may include means for transmitting a multiplier value that is associated with a characteristic of a protocol data unit or a protocol data unit set to be transmitted via the radio bearer. The apparatus may include means for initiating a discard timer for the protocol data unit or the protocol data unit set, the discard timer having a second discard timer value that corresponds to the first discard timer value multiplied by the multiplier value.

Aspects generally include a method, apparatus, system, computer program product, non-transitory computer-readable medium, user equipment, base station, network entity, network node, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example of a discard timer for protocol data unit communications, in accordance with the present disclosure.

FIG. 8 is a diagram illustrating an example process performed, for example, by a UE, in accordance with the present disclosure.

FIG. 9 is a diagram illustrating an example process performed, for example, by a network node, in accordance with the present disclosure.

DETAILED DESCRIPTION

Figure 1:
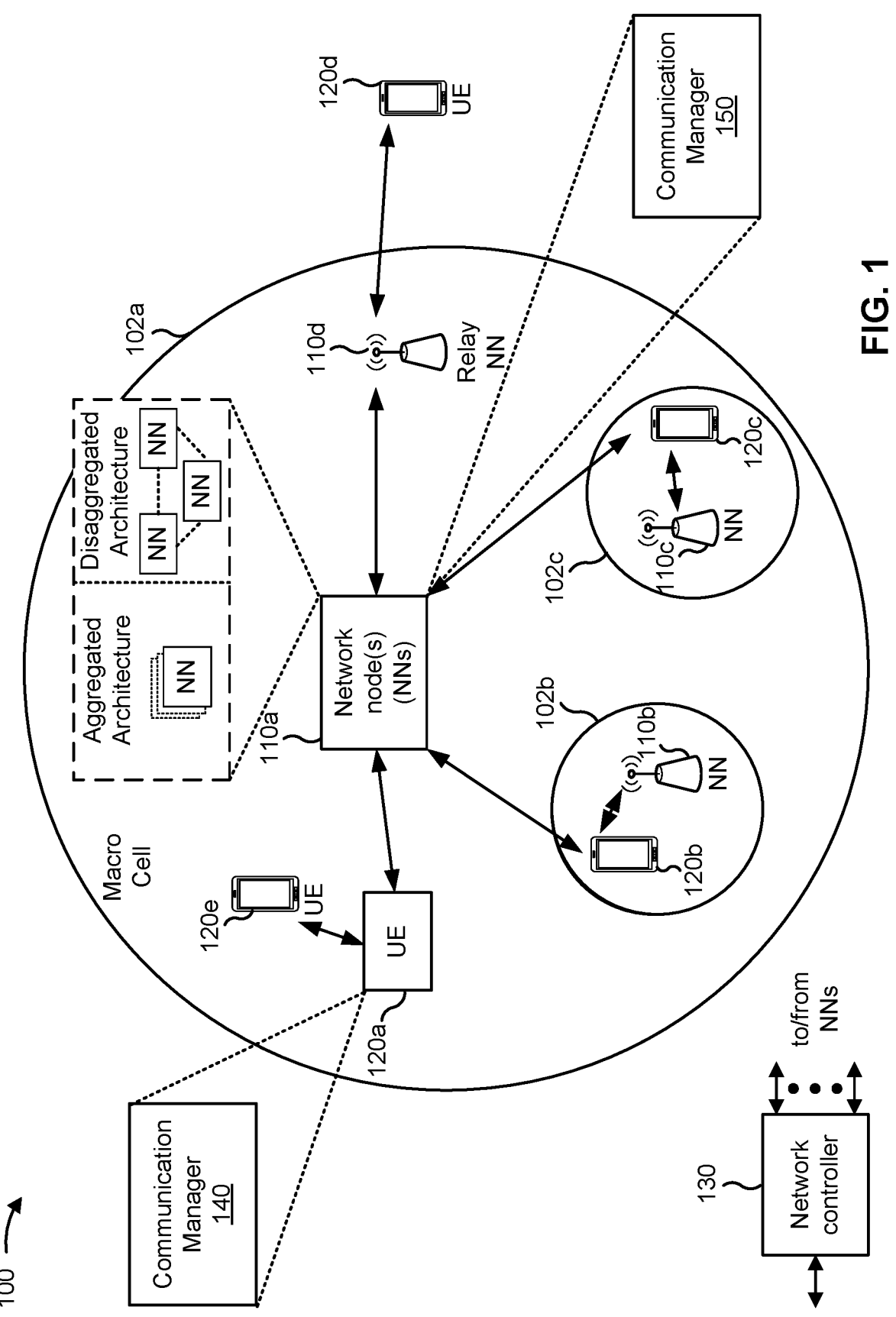
FIG. 1 is a diagram illustrating an example of a wireless network.

A protocol data unit (PDU) set may include multiple PDUs that are associated with a same application unit. In some cases, quality of service (QoS) parameters may be managed at the PDU set level. For example, an extended reality (XR) application may manage a PDU set error rate (PSER) and a PDU set delay budget (PSDB) for all PDUs included in a PDU set. Different application units may have different levels of importance, and therefore, different PDU sets associated with the different application units may have different QoS requirements. For example, a first PDU set that includes intra-coded frames (I-Frames) (which may also be referred to as reference frames) may have a first QoS requirement associated with a higher level of importance, and a second PDU set that includes predicted frames (P-Frames) may have a second QoS requirement associated with a lower level of importance. In some cases, multiple PDUs may be multiplexed on a single radio bearer. However, the radio bearer may only be configured with a single packet data convergence protocol (PDCP) discard timer. The discard timer may be associated with a discard timer value that corresponds to a time period during which a device stores a PDU in a memory, such as a buffer or a queue, among other examples. The device may initiate the discard timer for the PDU, for example, based at least in part on the PDU being received by a PDCP layer of the device. Upon expiration of the discard timer, the device may discard the PDU. Discarding the PDU may include deleting the PDU from the memory and/or refraining from transmitting the PDU via the radio bearer. In the example that the radio bearer is configured with the single discard timer, all PDUs on the radio bearer may be subject to the same discard timer. This may not be desirable when QoS parameters are managed at the PDU set level. For example, it may not be possible for the first PDU set and the second PDU set to have different discard timers since the first PDU set and the second PDU set are associated with the same radio bearer, even though the PDUs included in the first PDU set have a higher level of importance than the PDUs included in the second PDU set. Thus, the PDCP discard timer duration may either be too short for the PDUs included in the first PDU set, which may result in content disruption, or may be too long for the PDUs in the second PDU set, which may result in wasted device and system resources.

Techniques and apparatuses are described herein for a discard timer for PDU communications. In some aspects, a user equipment (UE) may receive a first discard timer value associated with a radio bearer. The UE may receive a multiplier value that is associated with a characteristic of a PDU or a PDU set to be transmitted via the radio bearer. The characteristic of the PDU or PDU set may be (or may be based at least in part on) an importance of the PDU or the PDU set, a type of traffic associated with the PDU or PDU set (such as whether the PDU or PDU set includes XR video traffic or non-XR video traffic), a type of frame included in the PDU or PDU set (such as whether the PDU or PDU set includes I-Frames or P-Frames), and/or a quality of service associated with the PDU or PDU set, among other examples. In some aspects, the UE may receive a plurality of multiplier values. For example, the UE may receive a first multiplier value associated with a first type of PDU or PDU set, such as a PDU or PDU set having a higher priority, and a second multiplier value associated with a second type of PDU or PDU set, such as a PDU or PDU set having a lower priority. The UE may initiate a discard timer for the PDU or the PDU set. The discard timer for the PDU or PDU set may have a second discard timer value that corresponds to the first discard timer value multiplied by the first multiplier value. For example, the UE may initiate a discard timer for the first type of PDU or PDU set based at least in part on multiplying the discard timer value by the first multiplier value (for example, the first discard timer value multiplied by four). Additionally, or alternatively, the UE may initiate a discard timer for the second type of PDU or PDU set based at least in part on multiplying the same discard timer value by another multiplier value (for example, the first discard timer value multiplied by two). Packets having higher priority may be subject to a longer discard timer, and thus may be stored by the UE for a longer time, and packets having a lower priority may be subject to a shorter discard timer, and thus may be discarded by the UE more quickly. This may allow packets having different priorities to be discarded at different time periods, even though the packets are on the same radio bearer. This may increase system reliability while reducing a number of wasted resources, among other benefits.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*c*), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120c) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive a first discard timer value associated with a radio bearer; receive a multiplier value that is associated with a characteristic of a protocol data unit or a protocol data unit set to be transmitted via the radio bearer; and initiate a discard timer for the protocol data unit or the protocol data unit set, the discard timer having a second discard timer value that corresponds to the first discard timer value multiplied by the multiplier value. Additionally, or alternatively, the communication manager 140 may perform one or more other operations described herein.

In some aspects, the network node 110 may include a communication manager 150. As described in more detail elsewhere herein, the communication manager 150 may transmit a first discard timer value associated with a radio bearer; transmit a multiplier value that is associated with a characteristic of a protocol data unit or a protocol data unit set to be transmitted via the radio bearer; and initiate a discard timer for the protocol data unit or the protocol data unit set, the discard timer having a second discard timer value that corresponds to the first discard timer value multiplied by the multiplier value. Additionally, or alternatively, the communication manager 150 may perform one or more other operations described herein.

As indicated above, FIG. 1 is provided as an example. Other examples may differ from what is described with regard to FIG. 1.

Figure 2:
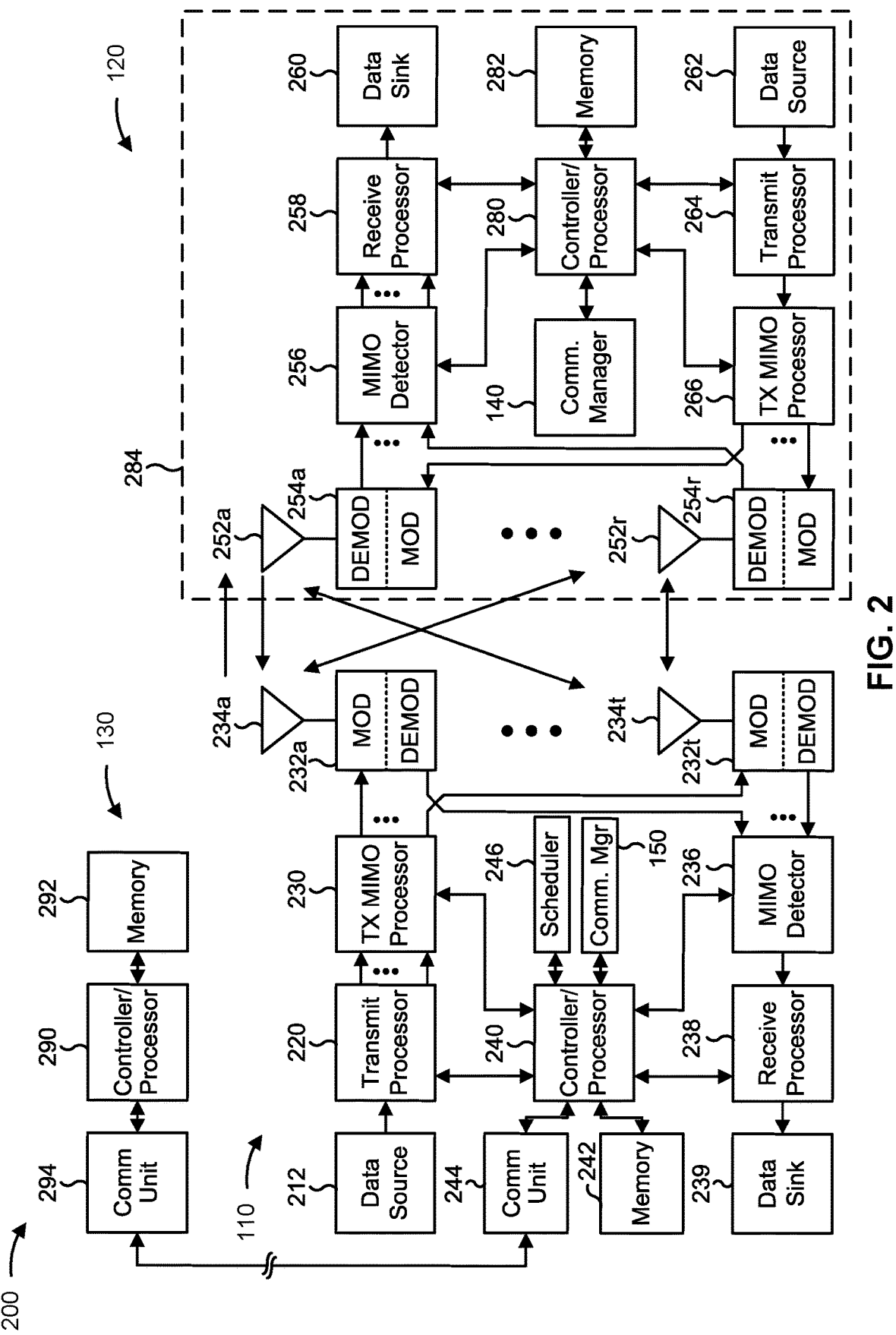
FIG. 2 is a diagram illustrating an example of a network node in communication with a user equipment (UE) in a wireless network.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 6-11).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 6-11).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with a discard timer for PDU communications, as described in more detail elsewhere herein. For example, the controller/processor 240 of the network node 110, the controller/processor 280 of the UE 120, or any other component(s) (or combinations of components) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving a first discard timer value associated with a radio bearer; means for receiving a multiplier value that is associated with a characteristic of a protocol data unit or a protocol data unit set to be transmitted via the radio bearer; and/or means for initiating a discard timer for the protocol data unit or the protocol data unit set, the discard timer having a second discard timer value that corresponds to the first discard timer value multiplied by the multiplier value. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting a first discard timer value associated with a radio bearer; means for transmitting a multiplier value that is associated with a characteristic of a protocol data unit or a protocol data unit set to be transmitted via the radio bearer; and/or means for initiating a discard timer for the protocol data unit or the protocol data unit set, the discard timer having a second discard timer value that corresponds to the first discard timer value multiplied by the multiplier value. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
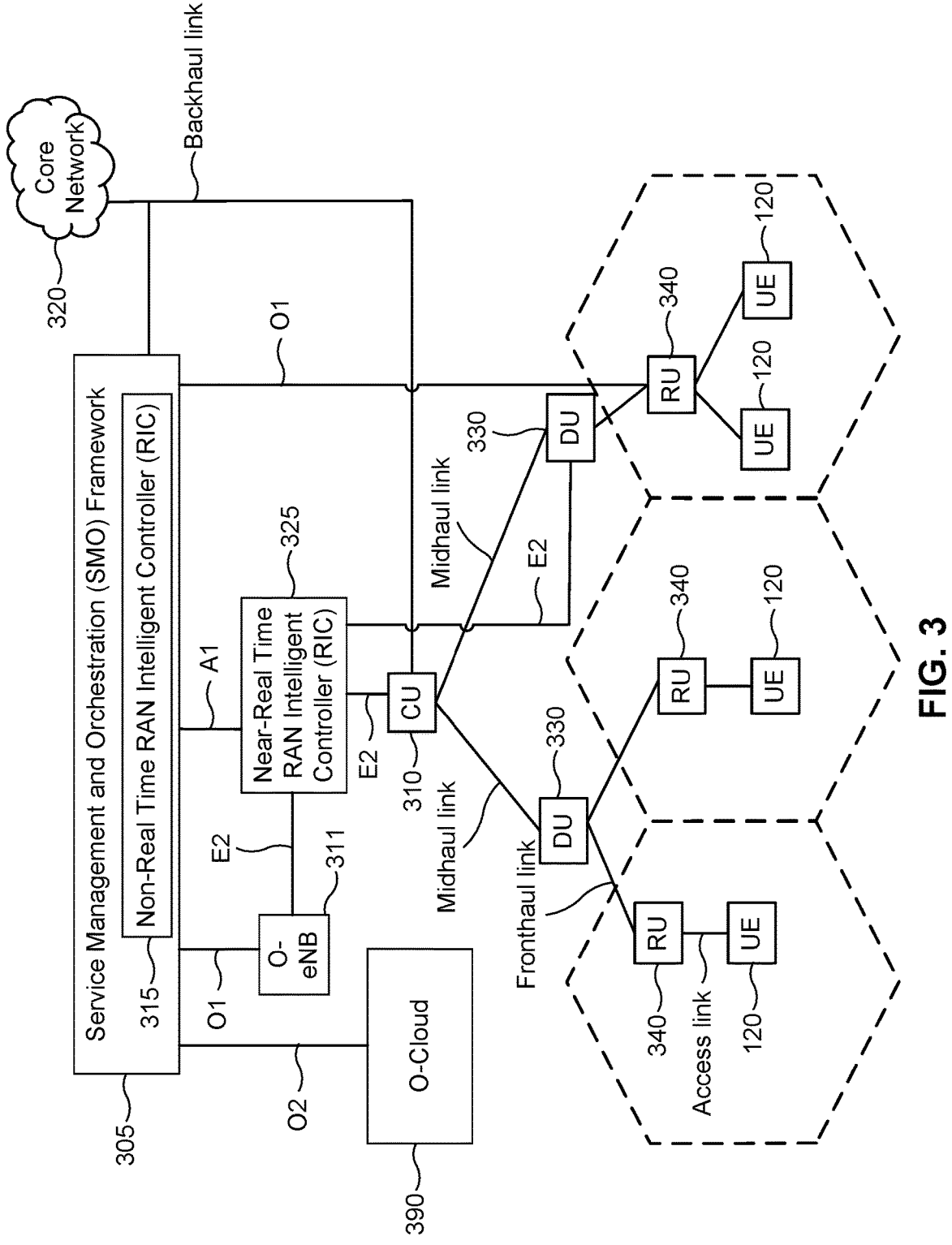
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, PDCP functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
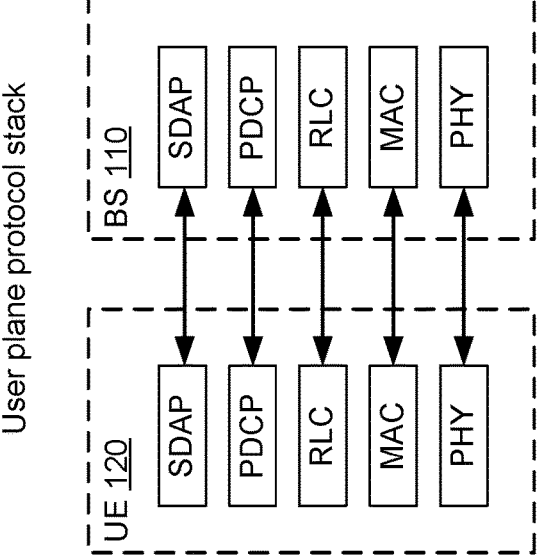
FIG. 4 is a diagram illustrating an example of a user plane protocol stack and a control plane protocol stack for a network node and a core network in communication with a UE, in accordance with the present disclosure.

FIG. 4 is a diagram illustrating an example 400 of a user plane protocol stack and a control plane protocol stack for a network node 110 and a core network in communication with a UE 120, in accordance with the present disclosure. In some aspects, the network node 110 may include a plurality of network nodes 110. In some aspects, protocol stack functions of the network node 110 may be distributed across multiple network nodes 110. For example, a first network node 110 may implement a first layer of a protocol stack and a second network node 110 may implement a second layer of the protocol stack. The distribution of the protocol stack across network nodes (in examples where the protocol stack is distributed across network nodes) may be based at least in part on a functional split, as described elsewhere herein. It should be understood that references to "a network node 110" or "the network node 110" can, in some aspects, refer to multiple network nodes.

On the user plane, the UE 120 and the network node 110 may include respective physical (PHY) layers, medium access control (MAC) layers, radio link control (RLC) layers, PDCP layers, and service data adaptation protocol (SDAP) layers. A user plane function may handle transport of user data between the UE 120 and the network node 110. On the control plane, the UE 120 and the network node 110 may include respective RRC layers. Furthermore, the UE 120 may include a non-access stratum (NAS) layer in communication with an NAS layer of an access and management mobility function (AMF). The AMF may be associated with a core network associated with the network node 110, such as a 5G core network (5GC) or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer, not shown in FIG. 4, may be higher than the SDAP/PDCP/RLC/MAC layer. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the network node 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (e.g., in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARQ), priority handling between UEs by means of dynamic scheduling, priority handling between logical channels of one UE by means of logical channel prioritization, and padding.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (e.g., if the UE 120 is receiving a downlink communication or the network node 110 is receiving an uplink communication), the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

As indicated above, FIG. 4 is provided as an example. Other examples may differ from what is described with regard to FIG. 4.

Figure 5A:
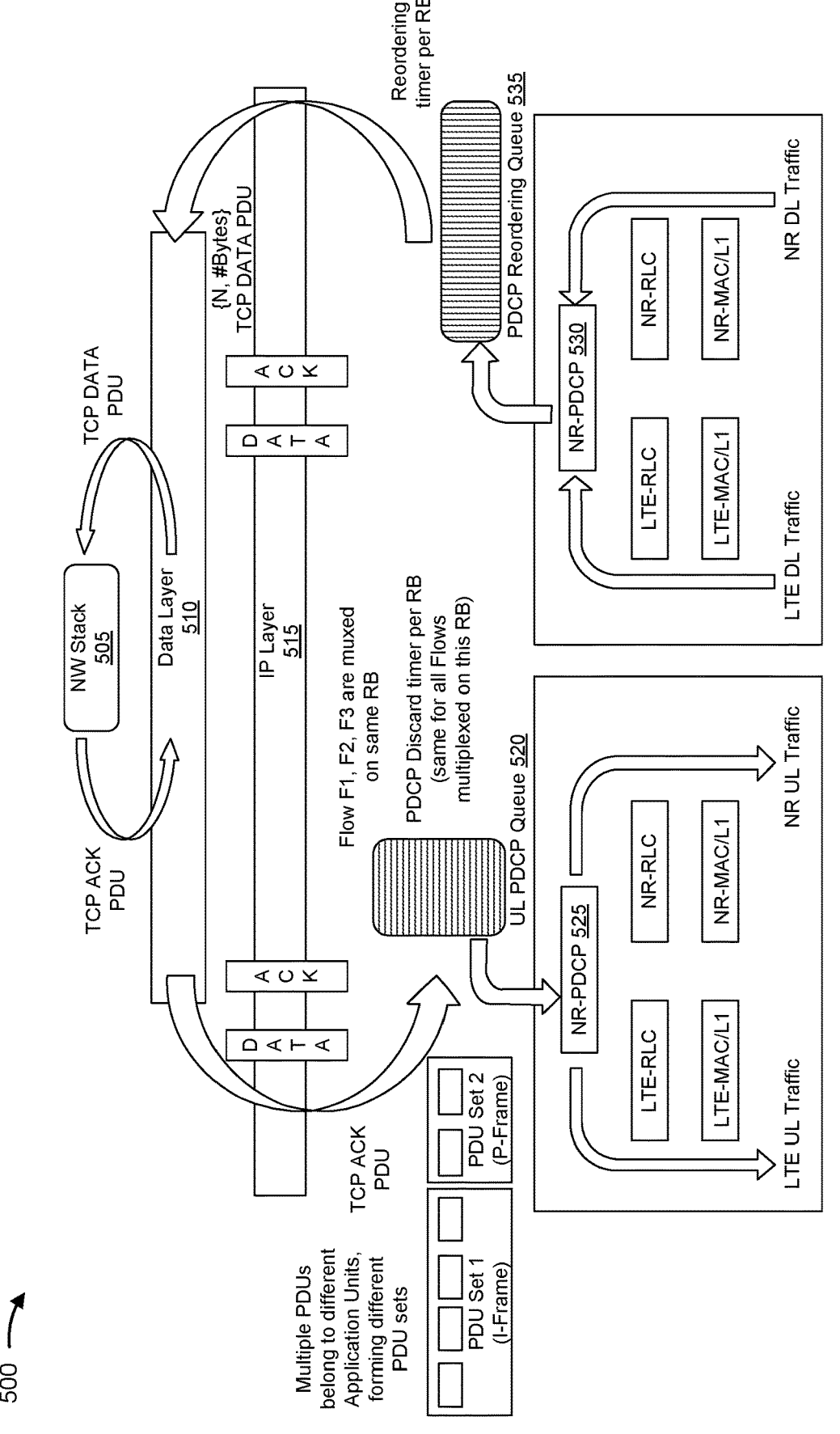
FIGS. 5A-5B are diagrams illustrating examples of protocol data unit communications, in accordance with the present disclosure.
Figure 5B:
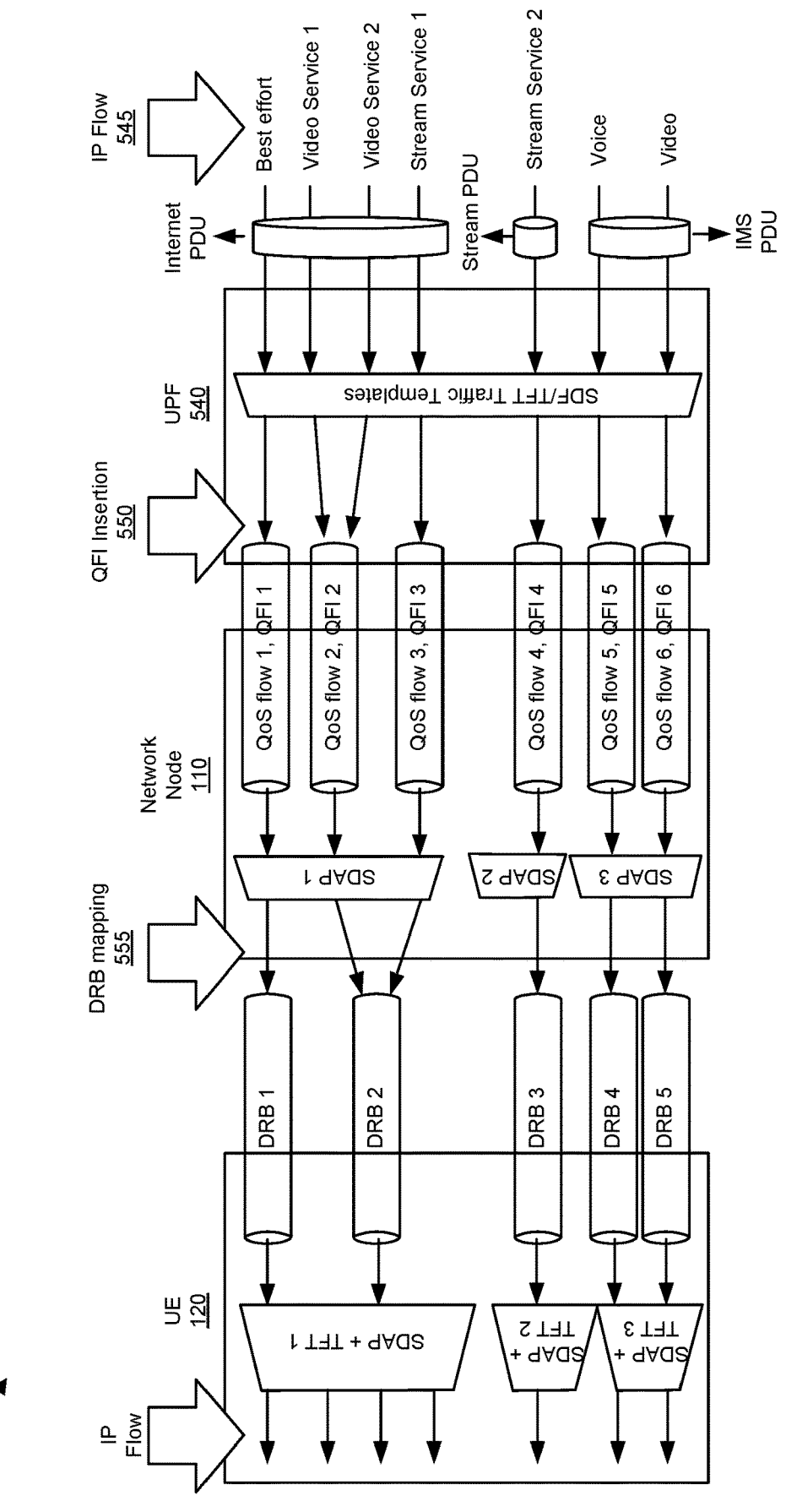

FIGS. 5A-5B are diagrams illustrating examples 500 of protocol data unit communications, in accordance with the present disclosure. In some cases, a PDU may be associated with a QoS flow. A QoS flow may be a guaranteed bit rate (GBR) QoS flow or a non-GBR QoS flow depending on the QoS profile associated with the QoS flow. The QoS profile associated with the QoS flow may be sent to a network node (for example, by the UE) and may include one or more QoS parameters. In some cases, for each QoS flow, the QoS profile may include a 5G QoS identifier (5QI) and an allocation and retention priority (ARP) as the QoS parameters for the QoS flow. For each non-GBR QoS flow, the QoS profile may include a reflective QoS attribute (RQA) as a QoS parameter. For each GBR QoS flow, the QoS profile may include a guaranteed flow bit rate (GFBR) (for UL and DL) and a maximum flow bit rate (MFBR) (for UL and DL) as QoS parameters. For a GBR QoS flow, the QoS profile may include notification control and/or a maximum packet loss rate (for UL and DL) as QoS parameters.

In some cases, a discard timer, such as a PDCP discard timer, may be configured for a radio bearer. Upon reception of a PDCP SDU from an upper layer, a transmitting PDCP entity may start the discard timer associated with the PDCP SDU. When the discard timer associated with the PDCP SDU expires, or the successful delivery of the PDCP SDU is confirmed by a PDCP status report, the transmitting PDCP entity may discard the PDCP SDU. The discard timer may be configured in the range of 0.5 milliseconds (ms) to 1500 ms.

In some cases, such as when an extended reality (XR) device is tethered to a UE via a wireless link, PDUs may arrive at the SDAP with non-negligible jitters. In some cases, a network node may confirm that a PDCP discard timer is managed per PDU set. Although all PDU sets in the same QoS flow may share the same PDU set delay budget (PSDB), a PDU set with high importance may be needed in the decoding of subsequent PDU sets, even when the PDU set misses a decoding deadline. In some cases, PDU sets having different importance can be configured with different PDCP discard timers. Applications having different PDU set integrated handling indications (PSIHI) may react to discard differently. In some cases, when a PDCP discard timer for a PDU set expires, all PDUs associated with the PDU set that have not been submitted to the lower layer (including those that have not been received yet) may be discarded. If the PSIHI of the PDU set indicates that all PDUs in the PDU set are needed by the application, the network may configure whether the PDUs that have already been submitted to the lower layers are to be discarded or not. In some cases, if a MAC PDU contains at least one MAC sub-PDU not to be discarded, the MAC PDU may not be subject to discard.

As shown in FIG. 5A, a network stack 505 may provide a transmission control protocol (TCP) acknowledgment (ACK) PDU to a data layer 510. The data layer 510 may provide data and the TCP ACK PDU to an Internet Protocol (IP) layer 515. The data layer 510 may provide the data and the TCP ACK PDU to a PDCP layer. The data may include, for example, multiple PDUs belonging to different application units, thereby forming different PDU sets. In one example, a first PDU set (PDU set 1) may include one or more intra-coded frames (I-Frames) and a second PDU set (PDU set 2) may include one or more predicted frames (P-frames). In some cases, multiple data flows may be multiplexed on a same radio bearer. For example, flows F1, F2, and F3 may be multiplexed on the same radio bearer (RB). The PDCP layer may configure a PDCP discard timer for each radio bearer. The PDCP discard timer may be the same for each flow multiplexed on the radio bearer (e.g., may have a same PDCP discard timer value for each flow multiplexed on the radio bearer). The data flows may be placed into a UL PDCP queue 520. An NR-PDCP 525 may enable transmission of the data flows, for example, as LTE UL traffic or NR UL traffic, using respective RLC, MAC, and PHY layers. An NR-PDCP 530 may receive LTE DL traffic or NR DL traffic that includes one or more data flows, for example, using respective PHY, MAC, and RLC layers. The NR-PDCP 530 may place the data flows in a PDCP reordering queue 535. The PDCP reordering queue 535 may reorder the data flows and may provide the data flows to the data layer 510. The data layer 510 may provide the data flows to the network stack 505.

As shown in FIG. 5B, a user plane function (UPF) 540 may receive a plurality of IP flows 545. The plurality of IP flows 545 may include, for example, a best effort flow, a first video service flow (video service 1), a second video service flow (video service 2), a first stream service flow (stream service 1), a second stream service flow (stream service 2), a voice flow, and a video flow, among other examples. The best effort flow, the first video service flow, the second video service flow, and the first stream service flow may be associated with an internet PDU. The second stream service flow may be associated with a stream service PDU. The voice flow and the video flow may be associated with an IP multimedia subsystem (IMS) PDU. The UPF 540, for example, using a service data flow/traffic flow template (SDF/TFT), may map the IP flows 545 to one or more QoS flows using a QFI insertion 550. For example, the UPF 540 may map the best effort flow to a first QoS flow having a first QFI (QoS flow 1, QFI 1), the first video service flow and the second video service flow to a second QoS flow having a second QFI (QoS flow 2, QFI 2), the first stream service flow to a third QoS flow having a third QFI (QoS flow 3, QFI 3), the second stream service flow to a fourth QoS flow having a fourth QFI (QoS flow 4, QFI 4), the voice flow to a fifth QoS flow having a fifth QFI (QoS flow 5, QFI 5), and the video flow to a sixth QoS flow having a sixth QFI (QoS flow 6, QFI 6). The network node 110 may map one or more of the QoS flows to one or more SDAP functions. For example, the network node 110 may map the first QoS flow, the second QoS flow, and the third QoS flow to a first SDAP function (SDAP 1), the fourth QoS flow to a second SDAP function (SDAP 2), and the fifth QoS flow and the sixth QoS flow to a third SDAP function (SDAP 3). The network node 110 may map one or more of the SDAP functions to one or more DRBs using a DRB mapping 555. For example, the network node 110 may map the first QoS flow associated with the first SDAP function to a first DRB (DRB1), the second QoS flow and the third QoS flow associated with the first SDAP function to a second DRB (DRB 2), the fourth QoS flow associated with the second SDAP function to a third DRB (DRB 3), the fifth QoS flow associated with the third SDAP function to a fourth DRB (DRB 4), and the sixth QoS flow associated with the third SDAP function to a fifth DRB (DRB 5). The UE 120 may map one or more of the DRBs to one or more SDAP and TFT functions. For example, the UE 120 may map the first DRB and the second DRB to a first SDAP and TFT function (SDAP+TFT 1), the third DRB to a second SDAP and TFT function (SDAP+TFT 2), and the fourth DRB and the fifth DRB to a third SDAP and TFT function (SDAP+TFT 3). The SDAP and TFT functions may output one or more IP flows.

A PDU set may include multiple PDUs that are associated with a same application unit. In some cases, QoS parameters may be managed at the PDU set level. For example, an XR application may manage a PDU set error rate (PSER) and a PDU set delay budget (PSDB) for all PDUs included in a PDU set. Different application units may have different levels of importance, and therefore, different PDU sets associated with the different application units may have different QoS requirements. For example, a first PDU set that includes I-Frames may have a first QoS requirement associated with a higher level of importance, and a second PDU set that includes P-Frames may have a second QoS requirement associated with a lower level of importance. In some cases, multiple PDUs may be multiplexed on a single radio bearer. However, the radio bearer may only be configured with a single PDCP discard timer. Thus, all PDUs on the radio bearer may be subject to the same discard timer. This may not be desirable when QoS parameters are managed at the PDU set level. For example, it may not be possible for the first PDU set and the second PDU set to have different discard timers since the first PDU set and the second PDU set are associated with the same radio bearer, even though the PDUs included in the first PDU set have a higher level of importance than the PDUs included in the second PDU set. Thus, the PDCP discard timer duration may either be too short for the PDUs included in the first PDU set, which may result in content disruption, or may be too long for the PDUs in the second PDU set, which may result in wasted device and system resources.

Techniques and apparatuses are described herein for a discard timer for PDU communications. In some aspects, a UE may receive a first discard timer value associated with a radio bearer. The UE may receive a multiplier value that is associated with a characteristic of a PDU or a PDU set to be transmitted via the radio bearer. The characteristic of the PDU or PDU set may be (or may be based at least in part on) an importance of the PDU or the PDU set, a type of traffic associated with the PDU or PDU set (such as whether the PDU or PDU set is associated with XR video traffic or non-XR video traffic), a type of frame included in the PDU or PDU set (such as whether the PDU or PDU set includes I-Frames or P-Frames), and/or a quality of service associated with the PDU or PDU set, among other examples. In some aspects, the UE may receive a plurality of multiplier values. For example, the UE may receive a first multiplier value associated with a first type of PDU or PDU set, such as a PDU or PDU set having a higher priority, and a second multiplier value associated with a second type of PDU or PDU set, such as a PDU or PDU set having a lower priority. The UE may initiate a discard timer for the PDU or the PDU set. The discard timer for the PDU or PDU set may have a second discard timer value that corresponds to the first discard timer value multiplied by the multiplier value. For example, the UE may initiate a discard timer for the first type of PDU or PDU set based at least in part on multiplying the discard timer value by the first multiplier value (for example, the first discard timer value multiplied by four). Additionally, or alternatively, the UE may initiate a discard timer for the second type of PDU or PDU set based at least in part on multiplying the same discard timer value by another multiplier (for example, the first discard timer value multiplied by two). Packets having higher priority may be subject to a longer discard timer, and thus may be stored by the UE for a longer time, and packets having a lower priority may be subject to a shorter discard timer, and thus may be discarded by the UE more quickly. This may allow packets having different priorities to be discarded at different time periods, even though the packets are on the same radio bearer. This may increase system reliability while reducing a number of wasted resources, among other benefits.

As indicated above, FIGS. 5A-5B are provided as examples. Other examples may differ from what is described with regard to FIGS. 5A-5B.

FIG. 6 is a diagram illustrating an example 600 of a discard timer for protocol data unit communications, in accordance with the present disclosure. A UE 120 may communicate with a network node 110.

As shown by reference number 605, the UE 120 may receive a first discard timer value associated with a radio bearer. For example, the network node 110 may transmit, and the UE 120 may receive, the first discard timer value associated with the radio bearer.

As shown by reference number 610, the UE 120 may receive a multiplier value. For example, the network node 110 may transmit, and the UE 120 may receive, the multiplier value. The multiplier value may be applied to the first discard timer value. The multiplier value may be associated with a characteristic of a PDU or a PDU set that is to be transmitted via the radio bearer. For example, the multiplier value may be associated with an importance of the PDU or the PDU set that is to be transmitted via the radio bearer. In some aspects, the UE may receive a plurality of multiplier values, where each multiplier value is associated with a different PDU or PDU set characteristic for a PDU or PDU set that is to be transmitted via the radio bearer.

In some aspects, the multiplier value may be a flow-level multiplier value. For example, the multiplier value may be applied to a PDU or PDU set having a flow-level characteristic (such as a QoS characteristic, among other examples). In some aspects, the multiplier value may be included as a parameter in a QoS profile associated with the PDU or PDU set.

In some aspects, the multiplier value may be a sub-flow-level multiplier value or a system-level multiplier value. For example, the multiplier value may be applied to all PDUs or PDU sets having a sub-flow level characteristic or system-level characteristic (such as a type of frame included in the PDU or PDU set, among other examples). In one example, the multiplier value may be based at least in part on a PSIHI mapping. For example, the UE 120 may receive a first multiplier value for a PDU or PDU set having a first PSIHI configuration and may receive a second multiplier value for a PDU or PDU set having a second PSIHI configuration. In another example, the multiplier value may be based at least in part on a frame type associated with the PDU or PDU set. For example, the UE 120 may receive a first multiplier value to be applied to I-Frames associated with an application unit and a second multiplier value to be applied to P-Frames associated with the application unit.

In some aspects, the discard timer may be for a PDU set. The discard timer (e.g., the PDU set discard timer) may be based at least in part on a logical relation between a plurality of flows and a dependency across the packets. For example, the PDU set discard timer may be configured to use a first discard timer value for a first logical relation between the flows and/or a first dependency across the packets and may be configured to use a second discard timer value for a second logical relation between the flows and/or a second dependency across the packets. The PDU set discard timer may obtain the second discard timer value based at least in part on applying a multiplier value to the first discard timer value.

In some aspects, the multiplier value may be included in a configuration, such as a static configuration. The multiplier value may be based at least in part on QoS requirement standardized values. In one example, PDUs or PDU sets having a first QoS requirement may be associated with a first multiplier value and PDUs or PDU sets having a second QoS requirement may be associated with a second multiplier value. In some aspects, a QoS requirement and an associated multiplier value may be included in a QoS mapping table.

As shown by reference number 615, the UE 120 may initiate a discard timer for the PDU or PDU set. The UE 120 may initiate the discard timer, for example, based at least in part on the PDU or PDU set being received by the PDCP layer. The discard timer may have a second discard timer value that corresponds to the first discard timer value multiplied by the multiplier value. In an example where the discard timer value is one second, and the multiplier value is two, the discard timer for the PDU or PDU set may have a second discard timer value of two seconds (one second times two). Thus, the UE 120 may discard the PDU or PDU set two seconds after the discard timer has been initiated. In some aspects, the network node 110 may initiate a discard timer. The discard timer initiated by the network node 110 may have the same discard timer value as the discard timer initiated by the UE 120. For example, the discard timer initiated by the network node 110 may have the second discard timer value that corresponds to the first discard timer value multiplied by the multiplier value. In some aspects, only one of the UE 120 or the network node 110 may initiate the discard timer having the second discard timer value. In some other aspects, both the UE 120 and the network node 110 may initiate the discard timer having the second discard timer value.

In some aspects, the UE 120 may be configured with a plurality of multiplier values corresponding, respectively, to a plurality of PDU or PDU set characteristics. In one example, the UE 120 may be configured with a first multiplier value (e.g., four) for PDUs or PDU sets having a first characteristic, such as PDU sets that are associated with XR video streaming, and a second multiplier value (e.g., two) for PDUs or PDU sets having a second characteristic, such as PDU sets that are associated with non-XR video streaming. The discard timer value for the PDU sets that include XR video streaming may be four seconds (one second times four) while the discard timer value for the PDU sets that include non-XR video streaming may be two seconds (one second times two). The UE 120 may be configured to discard the PDUs associated with the XR video stream after four seconds but may discard the PDUs associated with the non-XR video stream after only two seconds, even though the PDUs associated with the XR video stream and the PDUs associated with the non-XR video stream are transmitted using the same radio bearer. This may enable the UE 120 to discard packets having a lower importance more quickly than packets having a higher importance. Additionally, this may enable the UE 120 to store packets having a higher importance for a longer time period than packets having a lower importance. This may improve a likelihood that the packets having the higher importance are processed by UE 120 (for example, displayed to a user of the UE 120).

In some aspects, the discard timer may not expire. Therefore, packets having a high importance (for example, an importance that is greater than an importance threshold) may not be discarded by the UE 120 until the packets are processed by the UE 120 (for example, displayed to the user of the UE 120). For example, the second discard timer value for the discard timer may be set to an indefinite value (e.g., infinite). In this case, the UE 120 and/or the network node 110 may not discard the PDU or PDU set. For example, the UE 120 and/or the network node 110 may transmit the PDU or PDU set via the radio bearer.

As indicated above, FIG. 6 is provided as an example. Other examples may differ from what is described with regard to FIG. 6.

Figure 7:
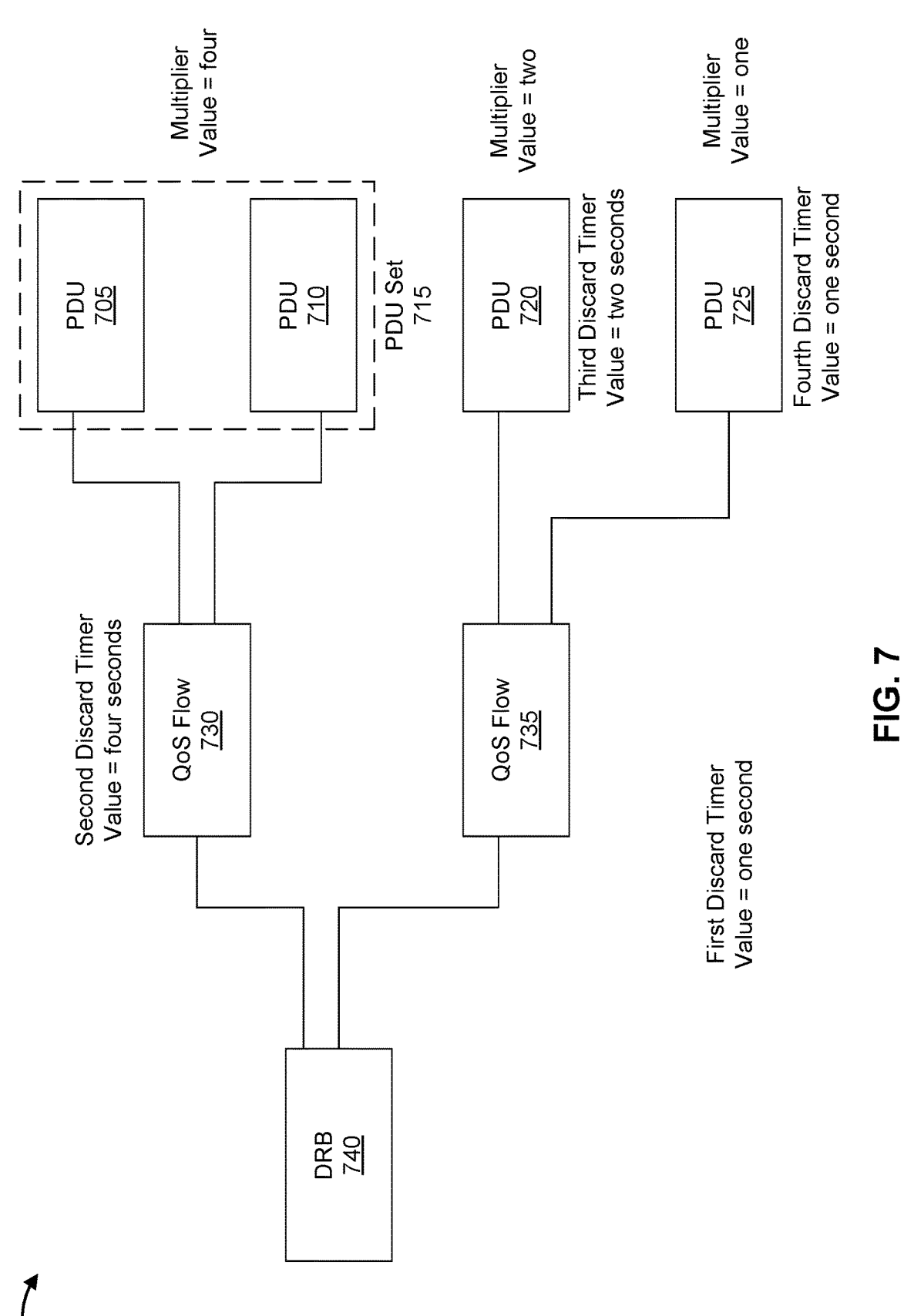
FIG. 7 is a diagram illustrating an example of discard timer multiplier values, in accordance with the present disclosure.

FIG. 7 is a diagram illustrating an example 700 of discard timer multiplier values, in accordance with the present disclosure. A PDU 705 and a PDU 710 may be included in PDU set 715. The PDU 705 and the PDU 710 may be associated with an XR application. For example, the PDU 705 may be associated with video for the XR application and the PDU 710 may be associated with audio for the XR application. A PDU 720 may include one or more I-Frames associated with a video stream. A PDU 725 may include one or more P-Frames associated with the video stream. Each PDU may include one or more PDUs. For example, PDU 705 may include 25 PDUs associated with the video for the XR application, PDU 710 may include 15 PDUs associated with the audio for the XR application, PDU 720 may include 40 I-Frames for the video stream, and PDU 725 may include 40 P-Frames for the video stream. The PDU set 715 (e.g., both the PDU 705 and the PDU 710) may be associated with a multiplier value of four. The PDU 720 may be associated with a multiplier value of two. The PDU 725 may be associated with a multiplier value of one. PDU 705 and PDU 710 may be transmitted via a QoS flow 730. A first discard timer value (e.g., a default discard timer value) for a data radio bearer 740 may be one second. All PDUs transmitted via the QoS flow 730 may have a discard timer value (shown as the "second discard timer value") of four seconds (one second times four). The PDU 720 associated with the QoS flow 735 may have a discard timer value (shown as the "third discard timer value") of two seconds (one second times two). The PDU 725 associated with the QoS flow may have a discard timer value (shown as the "fourth discard timer value") of one second (one second times one). Thus, multiple PDUs or PDU sets transmitted via the same data radio bearer (DRB 740) may have different discard timer values depending, for example, on respective priorities of the PDUs or PDU sets.

As indicated above, FIG. 7 is provided as an example. Other examples may differ from what is described with regard to FIG. 7.

FIG. 8 is a diagram illustrating an example process 800 performed, for example, by an apparatus for a UE, in accordance with the present disclosure. Example process 800 is an example where the apparatus for the UE (e.g., UE 120) performs operations associated with a discard timer for protocol data unit communications.

As shown in FIG. 8, in some aspects, process 800 may include receiving a first discard timer value associated with a radio bearer (block 810). For example, the UE (e.g., using reception component 1002 and/or communication manager 1006, depicted in FIG. 10) may receive a first discard timer value associated with a radio bearer, as described above.

As further shown in FIG. 8, in some aspects, process 800 may include receiving a multiplier value that is associated with a characteristic of a protocol data unit or a protocol data unit set to be transmitted via the radio bearer (block 820). For example, the UE (e.g., using reception component 1002 and/or communication manager 1006, depicted in FIG. 10) may receive a multiplier value that is associated with a characteristic of a protocol data unit or a protocol data unit set to be transmitted (e.g., by the UE) via the radio bearer, as described above.

As further shown in FIG. 8, in some aspects, process 800 may include initiating a discard timer for the protocol data unit or the protocol data unit set, the discard timer having a second discard timer value that corresponds to the first discard timer value multiplied by the multiplier value (block 830). For example, the UE (e.g., using communication manager 1006, depicted in FIG. 10) may initiate a discard timer for the protocol data unit or the protocol data unit set, the discard timer having a second discard timer value that corresponds to the first discard timer value multiplied by the multiplier value, as described above.

Process 800 may include additional aspects, such as any single aspect or any combination of aspects described below and/or in connection with one or more other processes described elsewhere herein.

In a first aspect, process 800 includes discarding the protocol data unit or the protocol data unit set based at least in part on an expiration of the discard timer.

In a second aspect, alone or in combination with the first aspect, process 800 includes initiating another discard timer for another protocol data unit or protocol data unit set that is associated with a same radio bearer as the protocol data unit or protocol data unit set, the other discard timer having a third discard timer value that is different than the second discard timer value and that corresponds to the first discard timer value multiplied by another multiplier value.

In a third aspect, alone or in combination with one or more of the first and second aspects, initiating the discard timer comprises initiating the discard timer based at least in part on the protocol data unit or the protocol data unit set arriving at a packet data convergence protocol layer.

In a fourth aspect, alone or in combination with one or more of the first through third aspects, receiving the multiplier value comprises receiving a quality of service profile that includes the multiplier value corresponding to the protocol data unit or the protocol data unit set.

In a fifth aspect, alone or in combination with one or more of the first through fourth aspects, the multiplier value applies to all protocol data units or protocol data unit sets having the characteristic.

In a sixth aspect, alone or in combination with one or more of the first through fifth aspects, each protocol data unit set of a plurality of protocol data unit sets is associated with a protocol data unit set integrated handling indication that indicates the multiplier value to be used for the protocol data unit set.

In a seventh aspect, alone or in combination with one or more of the first through sixth aspects, a first protocol data unit set of a plurality of protocol data unit sets is associated with a first multiplier value and a second protocol data unit set of the plurality of protocol data unit sets is associated with a second multiplier value that is different than the first multiplier value.

In an eighth aspect, alone or in combination with one or more of the first through seventh aspects, the first protocol data unit set includes one or more intra-coded frames associated with an application unit and the second protocol data unit set includes one or more predicted frames associated with the application unit.

In a ninth aspect, alone or in combination with one or more of the first through eighth aspects, receiving the multiplier value comprises receiving a plurality of multiplier values and a plurality of corresponding quality of service flow values, and the characteristic associated with the protocol data unit or the protocol data unit set includes a quality of service flow associated with the protocol data unit or the protocol data unit set.

In a tenth aspect, alone or in combination with one or more of the first through ninth aspects, the plurality of multiplier values and the plurality of corresponding quality of service flow values are included in a quality of service mapping table that maps each quality of service flow value to one or more multiplier values of the plurality of multiplier values.

In an eleventh aspect, alone or in combination with one or more of the first through tenth aspects, the protocol data unit set includes a plurality of protocol data units that are associated with a single application unit.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by an apparatus for a network node, in accordance with the present disclosure. Example process 900 is an example where the apparatus for the network node (e.g., network node 110) performs operations associated with a discard timer for protocol data unit communications.

As shown in FIG. 9, in some aspects, process 900 may include transmitting a first discard timer value associated with a radio bearer (block 910). For example, the network node (e.g., using transmission component 1104 and/or communication manager 1106, depicted in FIG. 11) may transmit a first discard timer value associated with a radio bearer, as described above.

As further shown in FIG. 9, in some aspects, process 900 may include transmitting a multiplier value that is associated with a characteristic of a protocol data unit or a protocol data unit set to be transmitted via the radio bearer (block 920). For example, the network node (e.g., using transmission component 1104 and/or communication manager 1106, depicted in FIG. 11) may transmit a multiplier value that is associated with a characteristic of a protocol data unit or a protocol data unit set to be transmitted (e.g., by the network node) via the radio bearer, as described above.

As further shown in FIG. 9, in some aspects, process 900 may include initiating a discard timer for the protocol data unit or the protocol data unit set, the discard timer having a second discard timer value that corresponds to the first discard timer value multiplied by the multiplier value (block 930). For example, the network node (e.g., using communication manager 1106, depicted in FIG. 11) may initiate a discard timer for the protocol data unit or the protocol data unit set, the discard timer having a second discard timer value that corresponds to the first discard timer value multiplied by the multiplier value, as described above.

Process 900 may include additional aspects, such as any single aspect or any combination of aspects described below and/or in connection with one or more other processes described elsewhere herein.

In a first aspect, process 900 includes discarding the protocol data unit or the protocol data unit set based at least in part on an expiration of the discard timer.

In a second aspect, alone or in combination with the first aspect, process 900 includes initiating another discard timer for another protocol data unit or protocol data unit set that is associated with a same radio bearer as the protocol data unit or protocol data unit set, the other discard timer having a third discard timer value that is different than the second discard timer value and that corresponds to the first discard timer value multiplied by another multiplier value.

In a third aspect, alone or in combination with one or more of the first and second aspects, initiating the discard timer comprises initiating the discard timer based at least in part on the protocol data unit or the protocol data unit set arriving at a packet data convergence protocol layer.

In a fourth aspect, alone or in combination with one or more of the first through third aspects, transmitting the multiplier value comprises transmitting a quality of service profile that includes the multiplier value corresponding to the protocol data unit or the protocol data unit set.

In a fifth aspect, alone or in combination with one or more of the first through fourth aspects, the multiplier value applies to all protocol data units or protocol data unit sets having the characteristic.

In a sixth aspect, alone or in combination with one or more of the first through fifth aspects, each protocol data unit set of a plurality of protocol data unit sets is associated with a protocol data unit set integrated handling indication that indicates the multiplier value to be used for the protocol data unit set.

In a seventh aspect, alone or in combination with one or more of the first through sixth aspects, a first protocol data unit set of a plurality of protocol data unit sets is associated with a first multiplier value and a second protocol data unit set of the plurality of protocol data unit sets is associated with a second multiplier value that is different than the first multiplier value.

In an eighth aspect, alone or in combination with one or more of the first through seventh aspects, the first protocol data unit set includes one or more intra-coded frames associated with an application unit and the second protocol data unit set includes one or more predicted frames associated with the application unit.

In a ninth aspect, alone or in combination with one or more of the first through eighth aspects, transmitting the multiplier value comprises transmitting a plurality of multiplier values and a plurality of corresponding quality of service flow values, and the characteristic associated with the protocol data unit or the protocol data unit set includes a quality of service flow associated with the protocol data unit or the protocol data unit set.

In a tenth aspect, alone or in combination with one or more of the first through ninth aspects, the plurality of multiplier values and the plurality of corresponding quality of service flow values are included in a quality of service mapping table that maps each quality of service flow value to one or more multiplier values of the plurality of multiplier values.

In an eleventh aspect, alone or in combination with one or more of the first through tenth aspects, the protocol data unit set includes a plurality of protocol data units that are associated with a single application unit.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
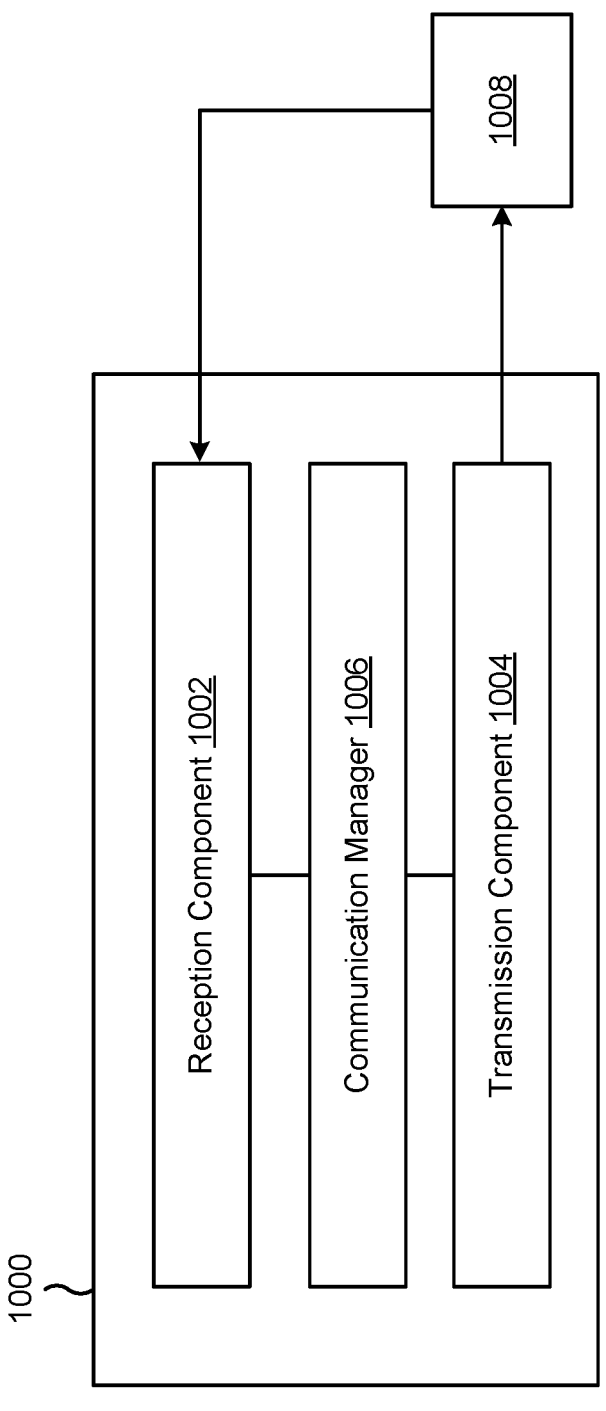
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/ processor, a memory, or a combination thereof, of the UE described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive a first discard timer value associated with a radio bearer. The reception component 1002 may receive a multiplier value that is associated with a characteristic of a protocol data unit or a protocol data unit set to be transmitted via the radio bearer. The communication manager 1006 may initiate a discard timer for the protocol data unit or the protocol data unit set, the discard timer having a second discard timer value that corresponds to the first discard timer value multiplied by the multiplier value.

The communication manager 1006 may discard the protocol data unit or the protocol data unit set based at least in part on an expiration of the discard timer. The communication manager 1006 may initiate another discard timer for another protocol data unit or protocol data unit set that is associated with a same radio bearer as the protocol data unit or protocol data unit set, the other discard timer having a third discard timer value that is different than the second discard timer value and that corresponds to the first discard timer value multiplied by another multiplier value.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
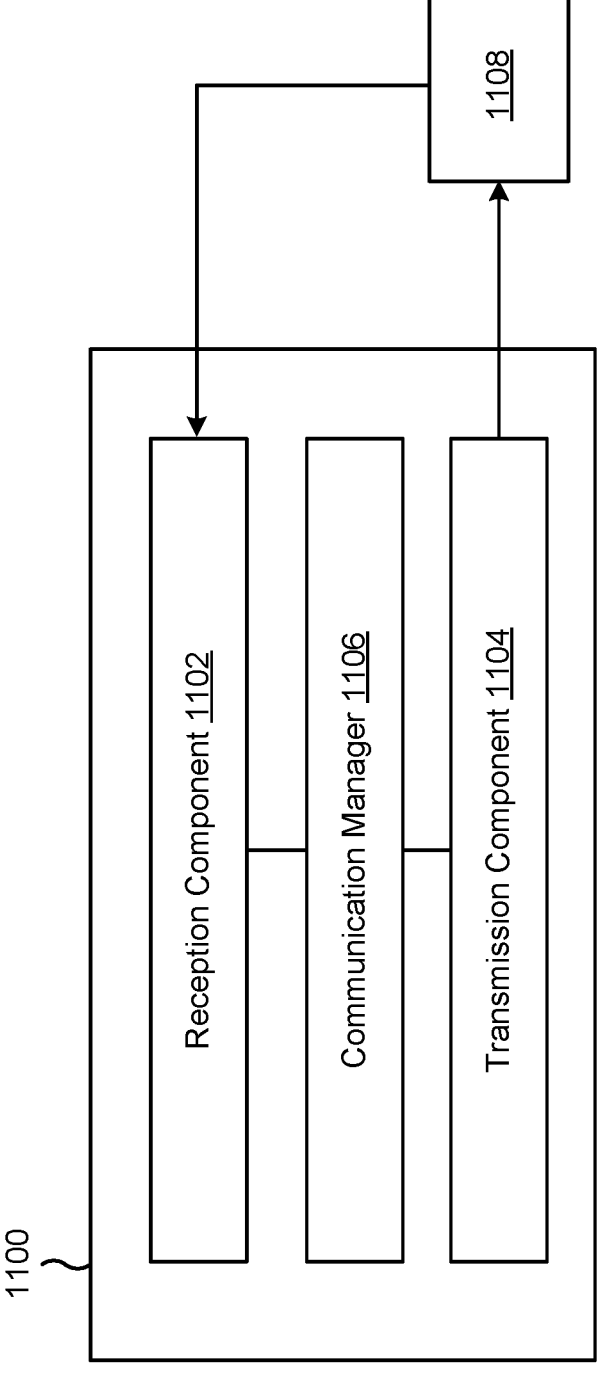
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The transmission component 1104 may transmit a first discard timer value associated with a radio bearer. The transmission component 1104 may transmit a multiplier value that is associated with a characteristic of a protocol data unit or a protocol data unit set to be transmitted via the radio bearer. The communication manager 1106 may initiate a discard timer for the protocol data unit or the protocol data unit set, the discard timer having a second discard timer value that corresponds to the first discard timer value multiplied by the multiplier value.

The communication manager 1106 may discard the protocol data unit or the protocol data unit set based at least in part on an expiration of the discard timer. The communication manager 1106 may initiate another discard timer for another protocol data unit or protocol data unit set that is associated with a same radio bearer as the protocol data unit or protocol data unit set, the other discard timer having a third discard timer value that is different than the second discard timer value and that corresponds to the first discard timer value multiplied by another multiplier value.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving a first discard timer value associated with a radio bearer; receiving a multiplier value that is associated with a characteristic of a protocol data unit or a protocol data unit set to be transmitted via the radio bearer; and initiating a discard timer for the protocol data unit or the protocol data unit set, the discard timer having a second discard timer value that corresponds to the first discard timer value multiplied by the multiplier value.

Aspect 2: The method of Aspect 1, further comprising discarding the protocol data unit or the protocol data unit set based at least in part on an expiration of the discard timer.

Aspect 3: The method of any of Aspects 1-2, further comprising initiating another discard timer for another protocol data unit or protocol data unit set that is associated with a same radio bearer as the protocol data unit or protocol data unit set, the other discard timer having a third discard timer value that is different than the second discard timer value and that corresponds to the first discard timer value multiplied by another multiplier value.

Aspect 4: The method of any of Aspects 1-3, wherein initiating the discard timer comprises initiating the discard timer based at least in part on the protocol data unit or the protocol data unit set arriving at a packet data convergence protocol layer.

Aspect 5: The method of any of Aspects 1-4, wherein receiving the multiplier value comprises receiving a quality of service profile that includes the multiplier value corresponding to the protocol data unit or the protocol data unit set.

Aspect 6: The method of any of Aspects 1-5, wherein the multiplier value applies to all protocol data units or protocol data unit sets having the characteristic.

Aspect 7: The method of Aspect 6, wherein the characteristic is associated with an importance of the protocol data unit or an importance of the protocol data unit set.

Aspect 8: The method of Aspect 6, wherein each protocol data unit set of a plurality of protocol data unit sets is associated with a protocol data unit set integrated handling indication that indicates the multiplier value to be used for the protocol data unit set.

Aspect 9: The method of Aspect 6, wherein a first protocol data unit set of a plurality of protocol data unit sets is associated with a first multiplier value and a second protocol data unit set of the plurality of protocol data unit sets is associated with a second multiplier value that is different than the first multiplier value.

Aspect 10: The method of Aspect 9, wherein the first protocol data unit set includes one or more intra-coded frames associated with an application unit and the second protocol data unit set includes one or more predicted frames associated with the application unit.

Aspect 11: The method of any of Aspects 1-10, wherein receiving the multiplier value comprises receiving a plurality of multiplier values and a plurality of corresponding quality of service flow values, and wherein the characteristic associated with the protocol data unit or the protocol data unit set includes a quality of service flow associated with the protocol data unit or the protocol data unit set.

Aspect 12: The method of Aspect 11, wherein the plurality of multiplier values and the plurality of corresponding quality of service flow values are included in a quality of service mapping table that maps each quality of service flow value to one or more multiplier values of the plurality of multiplier values.

Aspect 13: The method of any of Aspects 1-12, wherein the protocol data unit set includes a plurality of protocol data units that are associated with a single application unit.

Aspect 14: The method of any of Aspects 1-13, wherein the characteristic of the protocol data unit or the protocol data unit set is the characteristic of the protocol data unit set, and wherein initiating the discard timer for the protocol data unit or the protocol data unit set comprises initiating the discard timer for the protocol data unit set.

Aspect 15: A method of wireless communication performed by a network node, comprising: transmitting a first discard timer value associated with a radio bearer; transmitting a multiplier value that is associated with a characteristic of a protocol data unit or a protocol data unit set to be transmitted via the radio bearer; and initiating a discard timer for the protocol data unit or the protocol data unit set, the discard timer having a second discard timer value that corresponds to the first discard timer value multiplied by the multiplier value.

Aspect 16: The method of Aspect 15, further comprising discarding the protocol data unit or the protocol data unit set based at least in part on an expiration of the discard timer.

Aspect 17: The method of any of Aspects 15-16, further comprising initiating another discard timer for another protocol data unit or protocol data unit set that is associated with a same radio bearer as the protocol data unit or protocol data unit set, the other discard timer having a third discard timer value that is different than the second discard timer value and that corresponds to the first discard timer value multiplied by another multiplier value.

Aspect 18: The method of any of Aspects 15-17, wherein initiating the discard timer comprises initiating the discard timer based at least in part on the protocol data unit or the protocol data unit set arriving at a packet data convergence protocol layer.

Aspect 19: The method of any of Aspects 15-18, wherein transmitting the multiplier value comprises transmitting a quality of service profile that includes the multiplier value corresponding to the protocol data unit or the protocol data unit set.

Aspect 20: The method of any of Aspects 15-19, wherein the multiplier value applies to all protocol data units or protocol data unit sets having the characteristic.

Aspect 21: The method of Aspect 20, wherein the characteristic is associated with an importance of the protocol data unit or an importance of the protocol data unit set.

Aspect 22: The method of Aspect 20, wherein each protocol data unit set of a plurality of protocol data unit sets is associated with a protocol data unit set integrated handling indication that indicates the multiplier value to be used for the protocol data unit set.

Aspect 23: The method of Aspect 20, wherein a first protocol data unit set of a plurality of protocol data unit sets is associated with a first multiplier value and a second protocol data unit set of the plurality of protocol data unit sets is associated with a second multiplier value that is different than the first multiplier value.

Aspect 24: The method of Aspect 23, wherein the first protocol data unit set includes one or more intra-coded frames associated with an application unit and the second protocol data unit set includes one or more predicted frames associated with the application unit.

Aspect 25: The method of any of Aspects 15-24, wherein transmitting the multiplier value comprises transmitting a plurality of multiplier values and a plurality of corresponding quality of service flow values, and wherein the characteristic associated with the protocol data unit or the protocol data unit set includes a quality of service flow associated with the protocol data unit or the protocol data unit set.

Aspect 26: The method of Aspect 25, wherein the plurality of multiplier values and the plurality of corresponding quality of service flow values are included in a quality of service mapping table that maps each quality of service flow value to one or more multiplier values of the plurality of multiplier values.

Aspect 27: The method of any of Aspects 15-26, wherein the protocol data unit set includes a plurality of protocol data units that are associated with a single application unit.

Aspect 28: The method of any of Aspects 15-27, wherein the characteristic of the protocol data unit or the protocol data unit set is the characteristic of the protocol data unit set, and wherein initiating the discard timer for the protocol data unit or the protocol data unit set comprises initiating the discard timer for the protocol data unit set.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. An apparatus for wireless communication, comprising:
one or more memories; and
one or more processors coupled to the one or more memories, the one or more processors individually or collectively configured to:
receive a first discard timer value associated with a radio bearer;
receive a multiplier value that is associated with a characteristic of a protocol data unit or a protocol data unit set to be transmitted via the radio bearer, wherein the characteristic includes a quality of service flow associated with the protocol data unit or the protocol data unit set; and initiate a discard timer for the protocol data unit or the protocol data unit set, the discard timer having a second discard timer value that corresponds to the first discard timer value multiplied by the multiplier value.

2. The apparatus of claim 1, wherein the one or more processors are further configured to discard the protocol data unit or the protocol data unit set based at least in part on an expiration of the discard timer.

3. The apparatus of claim 1, wherein the discard timer comprises a first discard timer, and wherein the one or more processors are further configured to initiate a second discard timer for another protocol data unit or another protocol data unit set that is associated with a same radio bearer as the protocol data unit or the protocol data unit set, the second discard timer having a third discard timer value that is different than the second discard timer value and that corresponds to the first discard timer value multiplied by another multiplier value.

4. The apparatus of claim 1, wherein the one or more processors, to initiate the discard timer, are configured to initiate the discard timer based at least in part on the protocol data unit or the protocol data unit set arriving at a packet data convergence protocol layer of the apparatus.

5. The apparatus of claim 1, wherein the one or more processors, to receive the multiplier value, are configured to receive a quality of service profile that includes the multiplier value corresponding to the protocol data unit or the protocol data unit set.

6. The apparatus of claim 1, wherein the multiplier value applies to all protocol data units or all protocol data unit sets having the characteristic.

7. The apparatus of claim 6, wherein the characteristic is associated with an importance of the protocol data unit or an importance of the protocol data unit set.

8. The apparatus of claim 6, wherein each protocol data unit set of a plurality of protocol data unit sets is associated with a protocol data unit set integrated handling indication that indicates the multiplier value to be used for the protocol data unit set.

9. The apparatus of claim 6, wherein a first protocol data unit set of a plurality of protocol data unit sets is associated with a first multiplier value and a second protocol data unit set of the plurality of protocol data unit sets is associated with a second multiplier value that is different than the first multiplier value.

10. The apparatus of claim 9, wherein the first protocol data unit set includes one or more intra-coded frames associated with an application unit and the second protocol data unit set includes one or more predicted frames associated with the application unit.

11. The apparatus of claim 1, wherein receiving the multiplier value comprises receiving a plurality of multiplier values and a plurality of corresponding quality of service flow values.

12. The apparatus of claim 11, wherein the plurality of multiplier values and the plurality of corresponding quality of service flow values are included in a quality of service mapping table that maps each quality of service flow value to one or more multiplier values of the plurality of multiplier values.

13. The apparatus of claim 1, wherein the protocol data unit set includes a plurality of protocol data units that are associated with a single application unit.

14. The apparatus of claim 1, wherein the characteristic of the protocol data unit or the protocol data unit set is the characteristic of the protocol data unit set, and wherein the one or more processors, to initiate the discard timer for the protocol data unit or the protocol data unit set, are configured to initiate the discard timer for the protocol data unit set.

15. An apparatus for wireless communication, comprising:
    one or more memories; and
    one or more processors coupled to the one or more memories, the one or more processors individually or collectively configured to:
        transmit a first discard timer value associated with a radio bearer;
        transmit a multiplier value that is associated with a characteristic of a protocol data unit or a protocol data unit set to be transmitted via the radio bearer, wherein the characteristic includes a quality of service flow associated with the protocol data unit or the protocol data unit set; and
        initiate a discard timer for the protocol data unit or the protocol data unit set, the discard timer having a second discard timer value that corresponds to the first discard timer value multiplied by the multiplier value.

16. The apparatus of claim 15, wherein the one or more processors are further configured to discard the protocol data unit or the protocol data unit set based at least in part on an expiration of the discard timer.

17. The apparatus of claim 15, wherein the discard timer comprises a first discard timer, and wherein the one or more processors are further configured to initiate a second discard timer for another protocol data unit or another protocol data unit set that is associated with a same radio bearer as the protocol data unit or the protocol data unit set, the second discard timer having a third discard timer value that is different than the second discard timer value and that corresponds to the first discard timer value multiplied by another multiplier value.

18. The apparatus of claim 15, wherein the one or more processors, to initiate the discard timer, are configured to initiate the discard timer based at least in part on the protocol data unit or the protocol data unit set arriving at a packet data convergence protocol layer of the apparatus.

19. The apparatus of claim 15, wherein the one or more processors, to transmit the multiplier value, are configured to transmit a quality of service profile that includes the multiplier value corresponding to the protocol data unit or the protocol data unit set.

20. The apparatus of claim 15, wherein the multiplier value applies to all protocol data units or all protocol data unit sets having the characteristic.

21. The apparatus of claim 20, wherein the characteristic is associated with an importance of the protocol data unit or an importance of the protocol data unit set.

22. The apparatus of claim 20, wherein each protocol data unit set of a plurality of protocol data unit sets is associated with a protocol data unit set integrated handling indication that indicates the multiplier value to be used for the protocol data unit set.

23. The apparatus of claim 20, wherein a first protocol data unit set of a plurality of protocol data unit sets is associated with a first multiplier value and a second protocol data unit set of the plurality of protocol data unit sets is associated with a second multiplier value that is different than the first multiplier value.

24. The apparatus of claim 23, wherein the first protocol data unit set includes one or more intra-coded frames associated with an application unit and the second protocol data unit set includes one or more predicted frames associated with the application unit.

25. The apparatus of claim 15, wherein transmitting the multiplier value comprises transmitting a plurality of multiplier values and a plurality of corresponding quality of service flow values.

26. The apparatus of claim 25, wherein the plurality of multiplier values and the plurality of corresponding quality of service flow values are included in a quality of service mapping table that maps each quality of service flow value to one or more multiplier values of the plurality of multiplier values.

27. The apparatus of claim 15, wherein the protocol data unit set includes a plurality of protocol data units that are associated with a single application unit.

28. The apparatus of claim 15, wherein the characteristic of the protocol data unit or the protocol data unit set is the characteristic of the protocol data unit set, and wherein the one or more processors, to initiate the discard timer for the protocol data unit or the protocol data unit set, are configured to initiate the discard timer for the protocol data unit set.

29. A method of wireless communication performed by a user equipment (UE), comprising:
    receiving a first discard timer value associated with a radio bearer;
    receiving a multiplier value that is associated with a characteristic of a protocol data unit or a protocol data unit set to be transmitted via the radio bearer, wherein the characteristic includes a quality of service flow associated with the protocol data unit or the protocol data unit set; and
    initiating a discard timer for the protocol data unit or the protocol data unit set, the discard timer having a second discard timer value that corresponds to the first discard timer value multiplied by the multiplier value.

30. A method of wireless communication performed by a network node, comprising:
    transmitting a first discard timer value associated with a radio bearer;
    transmitting a multiplier value that is associated with a characteristic of a protocol data unit or a protocol data unit set to be transmitted via the radio bearer, wherein the characteristic includes a quality of service flow associated with the protocol data unit or the protocol data unit set; and
    initiating a discard timer for the protocol data unit or the protocol data unit set, the discard timer having a second discard timer value that corresponds to the first discard timer value multiplied by the multiplier value.

* * * * *